United States Patent Office 2,907,794
Patented Oct. 6, 1959

2,907,794
METHOD FOR PREPARING POLYHYDROXY-ACETOPHENONES

Werner Richard Boehme, Somerville, N.J., assignor to Ethicon, Inc., a corporation of New Jersey No Drawing. Application November 8, 1957
Serial No. 695,207

9 Claims. (Cl. 260—592)

This invention relates to a new method for preparing organic compounds. More particularly, the present invention is concerned with a novel process for preparing polyhydroxyacetophenones.

Polyhydroxyacetophenones such as di- and trihydroxyacetophenones are well known compounds and their preparation has been previously reported in the literature. Baker (J.C.S., 1939, 1922) prepared 2,3,6-trihydroxyacetophenone by oxidation of 2,6-dihydroxyacetophenone with potassium persulfate. Nakazawa [J. Pharm. Soc. Japan, 59, 297 (1939)] prepared the same trihydroxyacetophenone by oxidation of 2,4-dihydroxy-3-acetylbenzaldehyde with hydrogen peroxide. Ahluwahlia et al. [Proc. Ind. Acad. Sci., 38A, 480 (1953)] prepared 2,3-dihydroxyacetophenone through a four-step synthesis starting with 2,3-dimethoxybenzoic acid. Smith et al. [J.A.C.S., 73 793 (1951)] prepared the same dihydroxyacetophenone by reacting 2,3-dimethoxybenzaldehyde with a methyl Grignard reagent, oxidizing the resulting compound with chromic acid, and demethylating the so-obtained 2,3-dimethoxyacetophenone to the desired product.

The polyhydroxyacetophenones whose novel preparation constitutes the subject matter of this invention, are useful as tanning agents and as photographic developers. Their tanning properties stem from their ability to complex with proteins, e.g. collagen, to form products which are more durable and more resistant to enzymatic digestion than the proteins themselves. They are also useful as constituents in ink compositions because of their ability to form dark-colored precipitates in the presence of iron salts such as ferrous sulfate. As an example, a permanent blue-black ink may be prepared by adding a solution of 6.5 grams ferrous sulfate, 6.5 grams gum arabic, 7 milliliters glycerin and 1.5 grams phenol in 8 ounces of water to a solution of 8 grams 2,3,6-trihydroxyacetophenone in 25 ounces of water. In this solution there is dissolved 1.5 grams of Tiemann's Blue Soluble, the mixture is allowed to stand one week and is filtered.

In view of the many uses for which polyhydroxyacetophenones find application, it is highly desirable that suitable synthetic methods be available for their preparation. That is to say, methods should be available which would bring the polyhydroxyacetophenones within the realm of practical use. Unfortunately, the methods heretofore described in the prior art (such as those referred to above) are characterized by one or more disadvantages. Thus, Baker's method for preparing the dihydroxy compounds gives extremely poor yields, these being in the order of 10%. Nakazawa's method requires the use of 2,4-dihydroxy-3-acetylbenzaldehyde starting material, which is difficult to obtain. The Ahluwahlia and Smith methods also require the use of starting materials difficult to obtain and, in addition, involve long and tedious synthetic routes.

I have now discovered a method for preparing polyhydroxyacetophenones, especially di- and trihydroxyacetophenones, which is simple, direct and requires the use of easily available starting materials. Moreover, the method of this invention results in highly desirable yields of end-products, considerably higher than those heretofore obtained by prior art processes. In a general way, the process of this invention involves the conversion of 2-acyloacetyl-2,5-disubstituted-2,5-dihydrofurans preferably 2-acetoacetyl-2,5-dialkoxy-2,5-dihydrofurans, or the corresponding tetrahydrofurans directly to the desired polyhydroxyacetophenones by hydrolytic cleavage with a suitable organic or inorganic acid and intramolecular recyclization to the desired polyhydroxyacetophenone.

In accordance with one embodiment of the present invention the desired furan, such as 2-acetoacetyl-2,5-dimethoxytetrahydrofuran, is hydrolyzed to 2,3-dihydroxyacetophenone by treatment with an aqueous mineral acid such as hydrochloric acid at room (20–25° C.) or at elevated temperature, preferably at reflux. Any one of a wide variety of other inorganic or organic acids may be used to accomplish the hydrolysis, for example one of the other mineral acids such as sulfuric or phosphoric; a lower fatty acid such as acetic; a halogenated fatty acid such as trichloracetic; a polybasic acid such as oxalic acid; or a sulfonic acid such as p-toluenesulfonic, sulfonic, etc.

There are no particular limitations on the reaction conditions as to time or temperature, although the hydrolysis proceeds more speedily and efficiently at higher temperatures, preferably at reflux. Under these conditions, the reaction is usually complete in about one hour (at reflux) to sixteen hours (at room temperature 20–25° C.).

The starting materials useful in the process of this invention—namely, the 2-acyloacetyl-2,5-diacyloxy-2,5-dihydrofurans, 2-acyloacetyl-2,5-dialkoxy-2,5-dihydrofurans and the corresponding tetrahydrofurans are described in my copending application Serial No. 695,200, filed concurrently herewith, now abandoned. In general, these compounds may be prepared by acylating an appropriately substituted furoic acid ester with a monoketone or monoketo derivative containing at least one alpha hydrogen atom in the presence of a strong basic catalyst. The condensation may be conducted in the presence of a suitable organic solvent such as an ethereal solvent, for example, dioxane, diethyl ether or tetrahydrofuran, a hydrocarbon such as hexane or an alkanol such as methanol.

The alkoxy substituents in the 2,5-positions of the furan starting materials may be lower alkoxy groups such as methoxy, ethoxy, propoxy, butoxy, etc., or acyloxy groups such as acetoxy, propionoxy or chloracetoxy.

The compounds whose preparation is intended to be embraced within the scope of this invention are the polyhydroxyacetophenones having from two to six, preferably two to three, hydroxy groups attached directly to the benzene nucleus through any of the available ring carbon atoms of the acetophenone moiety, each of the ring carbon atoms containing not more than one such hydroxy group.

The following examples are illustrative of the invention but are not to be construed as limitative thereon.

Example I

A solution of 38.0 grams of ethyl furoate and one milliliter of concentrated sulfuric acid in 250 milliliters of methanol is electrolyzed in a nickel cathode-graphite anode cell as described by Clauson-Kaas, Limborg and Glens, Acta Chem. Scand. 6, 531, (1952). Nineteen and four-tenths ampere hours is passed in 8 hours beginning at 9 volts and 3.5 amperes at −15° to 22° C. The solution is then neutralized with a solution of sodium methoxide in methanol and concentrated under reduced pressure. The precipitated sodium sulfate is filtered off and the filtrates distilled. The product, ethyl 2,5-dimethoxy-2,5-dihydrofuroate boils at 126–139° C./21 mm., $n_D^{25}$ 1.4480.

A mixture of 25.9 g. of ethyl 2,5-dimethoxy-2,5-dihydrofuroate, 6.8 g. of sodium hydride and 6 glass marbles is stirred slowly in a round bottom flask. A solution of 16.5 g. of acetone in 25 ml. of anhydrous ether is added dropwise during a period of a half hour, maintaining the temperature at 30–40° C. with occasional cooling. Hydrogen is evolved and a thick amber paste results. Stirring is continued for a half hour longer, 100 ml. of anhydrous ether is added and the mixture is allowed to stand at room temperature for three days. Fifteen ml. of 95% ethanol is added, the mixture is cooled to 0° C. and the complex decomposed with 100 ml. of water and 18 g. of acetic acid. The layers are separated and the aqueous phase is extracted with 50 ml. of ether. The combined ether solutions are washed with sodium bicarbonate solution and dried over anhydrous magnesium sulfate. Distillation of the ether solution gives a light yellow liquid, 2-acetoacetyl-2,5-dimethoxy-2,5-dihydrofuran, boiling at 97° C./0.2 mm., $n_D^{23}$ 1.4956.

A mixture of 5.35 g. of 2-acetoacetyl-2,5-dimethoxy-2,5-dihydrofuran, 50 ml. of 0.1 N hydrochloric acid and a small chip of Dry Ice is stirred for six hours in a closed flask. 2,2′,4,4′,5,5′-hexahydroxy-3,3′-diacetylbiphenyl separates as a mustard-yellow precipitate and is removed by filtration of the suspension. It melts at 280° C. (dec.).

The clear yellow filtrates are cooled in ice. 2,3,6-trihydroxy-acetophenone separates as brilliant yellow crystals which are purified by recrystallization from water or by sublimation under reduced pressure. The melting point is 157.5° to 159° C.

*Example II*

A mixture of 26.1 g. of methyl 2,5-dimethoxytetrahydrofuroate (prepared by the method of Clauson-Kaas and Limborg, Acta Chem. Scand. 6, 551 (1952)), 6.6 g. of sodium hydride and 6 glass marbles is treated with 16 g. of acetone in 25 ml. of anhydrous ether, and the product, 2-acetoacetyl-2,5-dimethoxy-tetrahydrofuran, is isolated as in the foregoing example. It is obtained as a pale yellow liquid boiling at 87–91° C./0.5 mm., $n_D^{25}$ 1,4825.

A mixture of 7.4 g. of 2-acetoacetyl-2,5-dimethoxy-tetrahydrofuran and 75 ml. of 0.1 N hydrochloric acid is refluxed for one hour with stirring and cooled. The yellow crystalline product, 2,3-dihydroxyacetophenone which separates is removed by filtration. It melts at 98–98.5° C. when recrystallized from benzene-hexane.

I claim:

1. A method for preparing polyhydroxyacetophenones which comprises hydrolyzing a member selected from the group consisting of 2-acetoacetyl-2,5-diacyloxy-2,5-dihydrofurans, 2-acetoacetyl-2,5-dialkoxy-2,5-dihydrofurans, and the corresponding tetrahydrofurans with an acid.

2. A method as set forth in claim 1 wherein the acid is an organic acid.

3. A method as set forth in claim 1 wherein the acid is an inorganic acid.

4. A method for preparing polyhydroxyacetophenones which comprises hydrolyzing 2-acetoacetyl-2,5-dialkoxy-2,5-dihydrofurans with a mineral acid.

5. A method for preparing polyhydroxyacetophenones which comprises hydrolyzing 2-acetoacetyl-2,5-dialkoxy-2,5-tetrahydrofurans with a mineral acid.

6. A method for preparing 2,3,6-trihydroxyacetophenones which comprises hydrolyzing 2-acetoacetyl-2,5-dimethoxy-2,5-dihydrofuran with a mineral acid.

7. A method as set forth in claim 6 wherein the mineral acid is hydrochloric acid.

8. A method for preparing 2,3-dihydroxyacetophenone which comprises hydrolyzing 2-acetoacetyl-2,5-dimethoxytetrahydrofuran with a mineral acid.

9. A method as set forth in claim 8 wherein the mineral acid is hydrochloric acid.

No references cited.